United States Patent
Smith et al.

[15] 3,700,303
[45] Oct. 24, 1972

[54] EFFICIENT ILLUMINATION OF THE CORES ONLY OF A FIBER OPTIC BUNDLE USING HOLOGRAPHY

[72] Inventors: Luther W. Smith, Brimfield; Elias Snitzer, Wellesley, both of Mass.

[73] Assignee: American Optical Corporation, Southbridge, Mass.

[22] Filed: May 19, 1971

[21] Appl. No.: 144,762

[52] U.S. Cl. .................................350/3.5, 350/96 B
[51] Int. Cl. .............................................G02b 27/00
[58] Field of Search ............................350/3.5, 96 B

[56] References Cited

UNITED STATES PATENTS

| | | | |
|---|---|---|---|
| 3,627,400 | 12/1971 | Caulfield | 350/3.5 |
| 3,506,327 | 4/1970 | Leith et al. | 350/3.5 |

*Primary Examiner*—David Schonberg
*Assistant Examiner*—Ronald J. Stern
*Attorney*—William C. Nealon and Noble S. Williams

[57] ABSTRACT

Holographic method of recording and reconstructing a wavefront, from an array of light spots on a dark field, to propagate the reconstructed wavefront so as to illuminate the light spots to the exclusion of the dark field.

2 Claims, 4 Drawing Figures

Patented Oct. 24, 1972

INVENTOR

Luther W. Smith
ELIAS SNITZER

By Robert J Bird
Attorney

EFFICIENT ILLUMINATION OF THE CORES ONLY OF A FIBER OPTIC BUNDLE USING HOLOGRAPHY

BACKGROUND OF THE INVENTION

The present invention relates in general to holographic recording and reconstruction of light from an array of small light sources. More particularly, this invention relates to the recording and reconstruction of such light for the purpose of re-illuminating the original array of small light sources.

In some fiber optic devices, the light conducting cores are clad by cladding material in thicknesses ten or more times the core diameter. An end face of a bundle of such fibers, illuminated by a conventional light source, will guide very little of the light from the source through the fibers, particularly if there are absorbing regions in the cladding, simply because of the small ratio of the core (guiding) area to the cladding (non-guiding) area. For example, in a single round fiber having a 2.5 micron diameter core in a 50 micron diameter cladding, the cross-section is approximately ¼ percent light guiding core and 99 ¾ percent non-guiding cladding.

SUMMARY OF THE INVENTION

It is desirable, and an object of this invention, to provide a method for directing light at only the cores of a fiber optic bundle without directing such light at their cladding.

Another object is to provide a method of producing efficient, uniform illumination of an array of optical fibers.

Another and general object of this invention is to provide a method of generating light spots of illumination in an array of such spots on a dark field.

Briefly, the present invention is practiced in one form by recording a hologram of a photographic, positive transparency of a magnified image of an end array, or field, of transilluminated optical fibers. Upon re-illumination, the hologram reconstructs a wavefront that represents the primary image of the transparency and this light is projected back through the original magnifying lens to form a real image array of light spots that has the same size and spacing as, and can be put in registry with, the actual fiber array. The light from the reconstruction thus illuminates the cores and is conducted by the fibers to radiate from their opposite ends in the customary manner.

DRAWING

Other objects, advantages and features of this invention may become apparent from the following description thereof when taken in connection with the accompanying drawing.

DESCRIPTION

Figure 1:
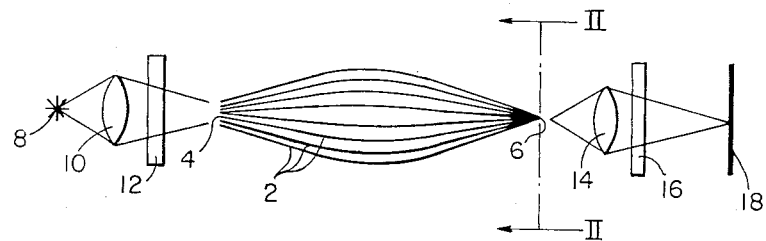
FIG. 1 is a schematic diagram of an optical system and bundle of optical fibers showing one use for the present invention.

Referring now to FIG. 1, a bundle of optical fibers is shown at 2 having end faces 4 and 6. This bundle 2 is disposed relative to a light source 8, a collector lens 10, and a filter 12, such that light from source 8 is collected and directed in a substantially monochromatic state to the end face 4 of the fiber bundle. As is known, light is transmitted from end face 4 through fibers 2 to end face 6. End face 6 is disposed relative to an objective lens 14 (having a magnification of 20× for example), a compensator plate 16, the purpose of which is explained later, and a film plate 18, such that a magnified image of end face 6 is projected onto film plate 18.

When fiber bundle 2 is placed in this optical system, no ordered arrangement of the ends 4 and 6 is necessary, though the fibers at 6 are permanently fixed. By introducing light to the end face 4, and thus transilluminating the fibers at end face 6, the array at end face 6 becomes the object of recording on film plate 18. The size of the fibers in bundle 2 is of the order of 50 microns in diameter, of which the cores are approximately 2.5 microns in diameter and the remainder is cladding. This fine detail is not capable of direct photographic resolution and so, to enable the face 6 to be photographed, the film plate 18 is exposed to an optically magnified image of end face 6, in which detail can be resolved.

Figure 2:
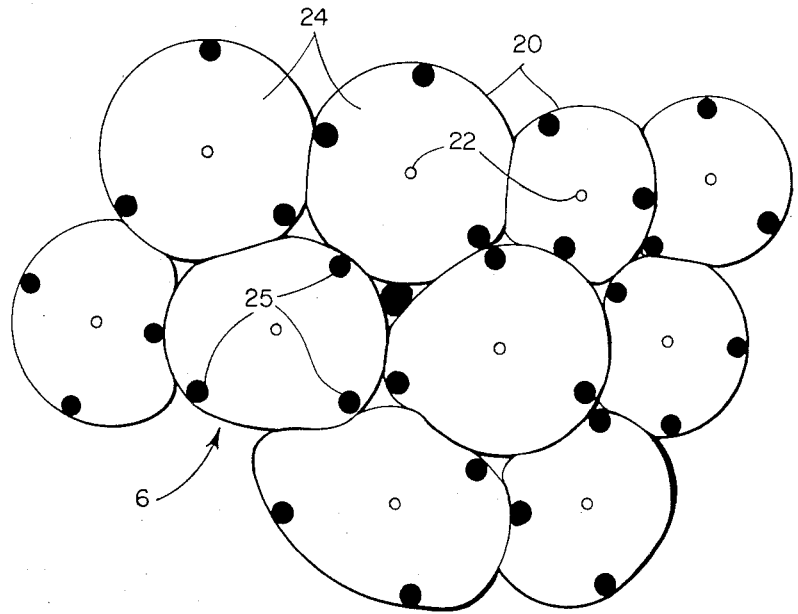
FIG. 2 is an enlarged cross-sectional view taken along the lines II—II of FIG. 1.

FIG. 2 is an enlarged view of the end face 6, showing individual fibers 20 including cores 22 and claddings 24, that may contain, or be bundled in optical contact with, light absorbing members 25. Assume now that it is desired to cause the fibers to radiate light at their other ends 4 for the purpose of illuminating some additional object in a controlled manner. If an ordinary light source were directed onto the surface 6 shown in FIG. 2, it will be appreciated that only a slight proportion of the light from such a source would be incident on the fiber cores 22, for transmission therethrough. By far the greater proportion of the incident light would fall on the cladding material 24 and be lost.

The film plate 18 records a negative image or transparency of the end face 6. From this negative 18, a positive transparency 18' is made. Positive transparency 18' is now the object from which a holographic recording is to be made.

Figure 3:
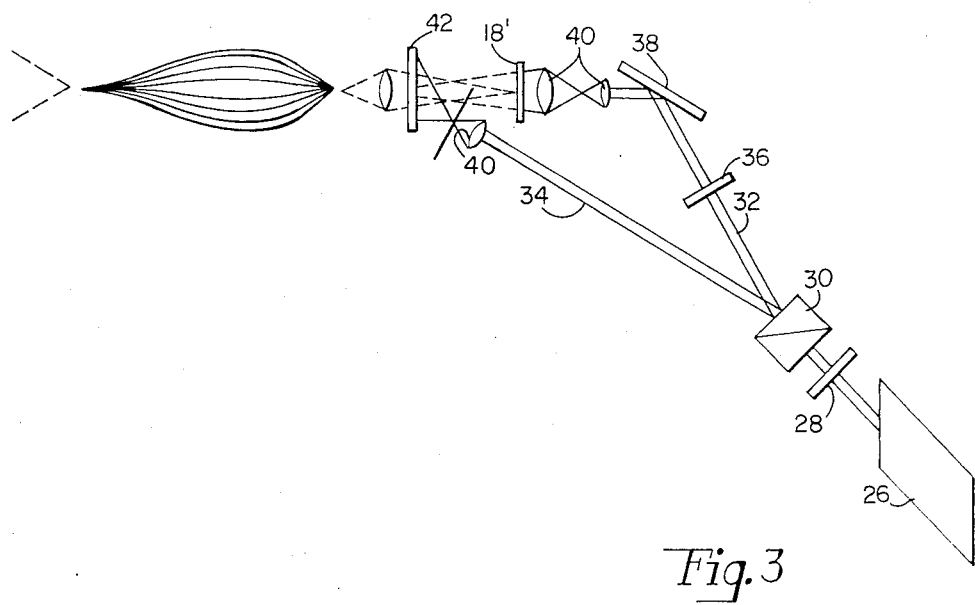
FIG. 3 is a diagram of a holographic recording system.

Referring now to FIG. 3, a hologram recording system is shown and includes a source of coherent light 26, a half-wave plate 28, and a suitable beam splitter 30 in optical alignment. Beam splitter 30 divides the light beam from source 26 into an object component 32 and a reference component 34. A second half-wave plate 36 and a suitable mirror 38 and beam expander 40 are also disposed in the path of the object component 32 so as to direct the same onto the positive transparency 18'. The object component 32 after passing through transparency 18', and reference component 34 converge at hologram plate 42 where their interference pattern is recorded in a known manner of holography. The holographic recording thus produced is of that portion of the light in component 32 that is transmitted by the positive transparency 18'. Thus, the transilluminated transparency acts as a coherently radiating duplicate of the real magnified image of end face 6 with its array of light spots on a dark field.

Figure 4:
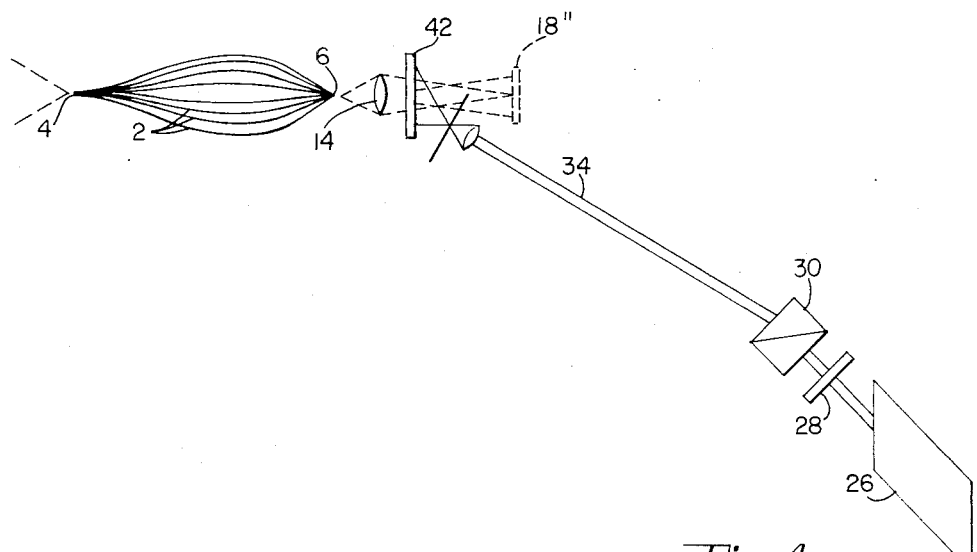
FIG. 4 is a diagram of a holographic reconstruction system positioned adjacent the optical fiber bundle of FIG. 1.

Referring now to FIG. 4, the holographic reconstruction system shown is similar to the recording system in FIG. 3 with the object component 32 and the object 18' removed. This reconstruction system includes the same coherent light source 26, half-wave plate 28, and reference (reconstruction) component 34. When hologram plate 42 is thus illuminated by the light from beam 34 a primary image wavefront traveling toward lens 14 is reconstructed. The light in the wavefront appears to diverge from a (virtual) image 18'' of the positive transparency 18'. The compensator plate 16 in FIG. 1 is a transparent plate placed at the same location as is occupied by hologram plate 42 in FIG. 4 and is of the same thickness. Its purpose is to compensate for the fact that the emulsion of the hologram in FIG. 4 is on the side of the plate facing the incoming light from beam 34 so that the light distribution from the hologram reconstruction will have to pass through the plate 42 on its way to objective 14 and end face 6. Again, the reconstructed light distribution appears to come from a distribution of light spots (image 18'') that have the same size and spacing as was obtained in the real, magnified image of the array on end face 6. Even irregularities in the intensity distribution are duplicated, so lens 14 need not be highly corrected or aberration free. The light energy in the reconstruction, however, travels through lens 14 to form an aberration free, demagnified image on the plane of end face 6 so as to be coincident therewith.

The light spots from the reconstructed image are thus superimposed on, or placed in registry with, the cores 22 in end face 6 and the dark field in the reconstruction is superimposed on, or placed in registry with, the surrounding claddings 24 in end face 6. Thus, light directed through the hologram 42 is propagated only to the desired cores 22, corresponding to the light spots in the holographic reconstruction. This provides intense illumination where it is desired and excludes light from the dark field where it would be otherwise lost. With end face 6 fixed, and the cores 22 thus illuminated, the fiber cores at end face 4 become illuminated and can be arranged into any desired geometry.

It will be apparent that by means of the foregoing disclosed invention, it is possible to provide useful illumination to an array of light spots on a dark field while not expending radiant energy on the dark field itself. In applications such as disclosed, wherein the light spots (optical fiber cores) are so small relative to the dark field (their cladding), this advantage of selectively directing the illumination to the light spots only, and the resulting increased illumination efficiency are appreciable.

This invention has been disclosed in connection with one useful application, the efficient illumination of an array of optical fiber cores. However, it will be appreciated that the invention is not limited to such an application. It may be used in many situations to illuminate an array of distinct spots on a dark field. Furthermore, the position of these distinct spots is not limited to a particular finite distance from the hologram. They could also be at infinity, or in other words, the light propagating from the hologram could be parallel.

It may occur to others to make modifications of this invention which will lie within its concept and scope and not constitute a departure therefrom. Accordingly, it is intended that the invention be not limited by any details of its description but only by the following claims:

What is claimed is:

1. A method of directing light at the cores only of a bundle of optical fibers, each such fiber including a core and cladding, comprising the steps of:

illuminating one end of said bundle of optical fibers and recording a photographic image of the light emitted from the opposite end of said bundle, recording a hologram of said photographic image, said photographic image consisting of an array of distinct spots on a dark field, wherein said spots are the images of the light emitted from said cores and said dark field represents the area of the cladding illuminating the hologram to thereby reconstruct a wavefront which represents said photographic image, projecting this wavefront to form an image array of light spots of the same size and spacing as said light emitted from said other end of said fiber optic bundle on said other end and aligning the light spot images with said cores, thus illuminating the cores only of the bundle, and conducting light energy to the first end of said bundle through said cores only.

2. A method as defined in claim 1 further including the steps of:

magnifying the image of said field prior to photographing the same, and correspondingly demagnifying the photographic image in projecting said photographic image to the plane of said field.

* * * * *